United States Patent [19]
Adolphi et al.

[11] Patent Number: 5,563,675
[45] Date of Patent: Oct. 8, 1996

[54] SPECIAL EFFECTS CARRIER

[75] Inventors: John Adolphi, Eden Prairie; Jeffrey J. Kipp, Minneapolis; Michael Surma, Golden Valley; Gerald A. Jensen, Plymouth; Jerry Lindenfelser, Brooklyn Park, all of Minn.

[73] Assignee: Lifetouch Portrait Studios, Inc., Minneapolis, Minn.

[21] Appl. No.: 447,202

[22] Filed: May 22, 1995

Related U.S. Application Data

[63] Continuation of Ser. No. 954,119, Sep. 30, 1992, abandoned, which is a continuation-in-part of Ser. No. 887,271, May 21, 1993, abandoned.

[51] Int. Cl.⁶ .................................................. G03B 11/00
[52] U.S. Cl. ........................ 396/545; 396/544; 396/435
[58] Field of Search ..................................... 354/102, 125, 354/296

[56] References Cited

U.S. PATENT DOCUMENTS

| | | | |
|---|---|---|---|
| 1,173,861 | 2/1916 | Quinn | 354/125 |
| 1,226,838 | 5/1917 | Wolber | 354/125 |
| 3,282,186 | 11/1966 | Niccolls | 354/121 |
| 3,984,850 | 10/1976 | Bly | 354/125 |
| 4,079,394 | 3/1978 | Roncone | 354/122 |
| 4,247,190 | 1/1981 | Hashimoto et al. | 354/286 |
| 4,304,471 | 12/1981 | Jones | 354/108 |
| 4,738,526 | 4/1988 | Larish | 354/412 |
| 4,835,563 | 5/1989 | Larish | 354/412 |
| 4,853,733 | 8/1989 | Watanabe et al. | 354/412 |
| 5,038,161 | 8/1991 | Ki | 354/125 |

*Primary Examiner*—Michael L. Gellner
*Assistant Examiner*—Eddie C. Lee
*Attorney, Agent, or Firm*—Haugen and Nikolai, P.A.

[57] ABSTRACT

A special effects carrier for use in a photographic camera for taking portraits of individuals or groups. The wheel-shaped special effects carrier contains masks which produce various special effects. One of the masks included on the carrier produces no special effects so that the carrier can be used whether or not a special effect is desired. The carrier is located a fixed distance behind the objective element of the zoom lens so that the photographer is able to focus the camera without having to compensate for the changing focal length of the zoom lens. The carrier is connected to a CPU which drives a motor to rotate the carrier. An optical sensor reads bar codes on the carrier and relays information to the CPU thereby allowing the CPU to position the masks for use and freeing the photographer of that task.

18 Claims, 3 Drawing Sheets

5,563,675

SPECIAL EFFECTS CARRIER

This is a continuation of application Ser. No. 07/954,119, filed Sep. 30, 1992, which is a continuation-in-part of application Ser. No. 07/887271, filed on May 21, 1992, entitled AUTOMATED PORTRAIT STUDIO, both now abandoned.

FIELD OF THE INVENTION

The present invention relates to cameras, and in particular, to an automated special effects carrier containing masks for producing various special effects on photographic portraits.

BACKGROUND OF THE INVENTION

One aspect of commercial photography is creating portraits with special effects. The wide variety of effects available include soft focus, vignettes and burned corners. These effects are created by placing a mask capable of producing the desired effect in front of the camera lens before taking the picture. This procedure, however, can become quite inconvenient. Each mask must typically be manually inserted into position before the picture is taken, and then manually removed afterwards. Even devices that contain multiple masks on a single template suffer from this drawback. The photographer must manually rotate or otherwise properly position the template before use. This can become particularly tiresome and perhaps lead to errors when a sequence of photographs are being shot.

Prior art masks contain a further defect. Zoom lenses are commonly used in portrait photography. When using a mask with a zoom lens, however, the mask must be continually repositioned each time the zoom lens is adjusted to compensate for the changing focal length of the zoom lens. This requires a skilled photographer and a great expenditure of energy to ensure that the mask is properly positioned.

SUMMARY OF THE INVENTION

The invention provides an automated special effects carrier for producing photographic portraits with special effects. The wheel-shaped carrier contains multiple masks for creating selected special effect, such as vignetting, burnt corners, etc., that can be used with a zoom lens because it is permanently positioned inside the camera behind the rear element in the columnated light zone of the zoom lens. Locating the carrier behind the rear element in the columnated light zone ensures that the focal lengths between the film port, the special effects carrier and the real element of the zoom lens always remains constant and allows the photographer to focus the camera in the traditional manner without the need to reposition the carrier in compensating for the effects of the zoom lens.

The carrier is also automated so that it may be electronically-operated. A sequence of portrait poses including ones with special effects, can be entered into a central processing unit (CPU). The CPU then rotates the carrier to the proper mask during the shooting sequence thereby, allowing the photographer to photograph the subjects without stopping to insert or position a special effects mask.

Included on the carrier is a mask or frame that leaves unmodified the optical characteristics of the image focused on the film port so that portraits without special effects can still be taken when the special effects carrier disk is in place inside the camera.

DETAILED DESCRIPTION OF THE INVENTION

The present invention relates to photographic cameras suitable for portrait photography. The special effects carrier or wheel is adaptable for use in a portrait camera with a standard lens as well as a camera containing a zoom lens. Although suitable for both types of lenses, the invention will be described only in relation to a camera using a zoom lens as that is the more complicated configuration and is very common in portrait photography. The operation of the invention remains the same if the zoom lens is removed and replaced by a standard lens.

Figure 1:
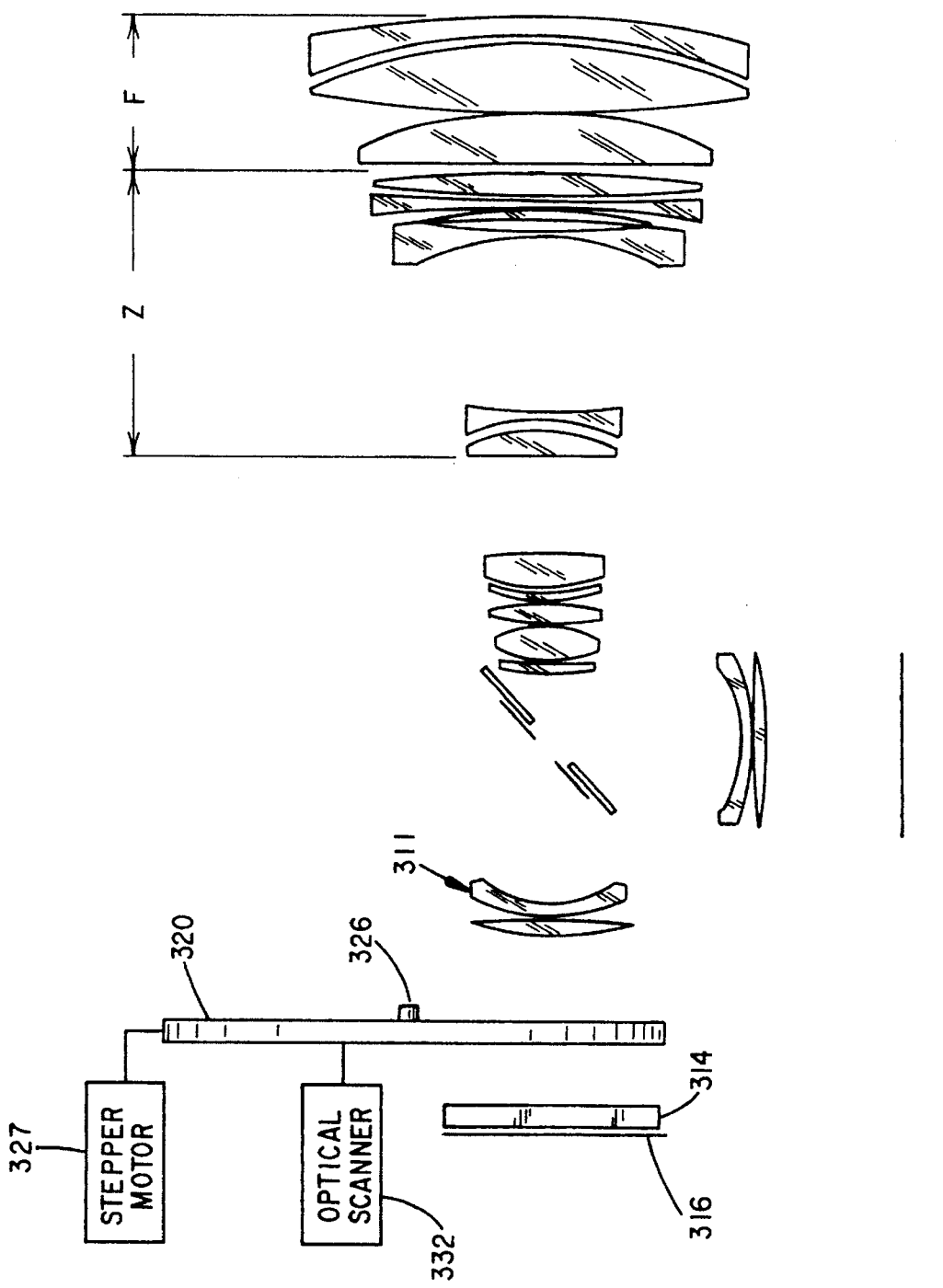
FIG. 1 is a top view of the camera lens assembly showing the location of the special effects carrier relative to the zoom lens.
Figure 2:
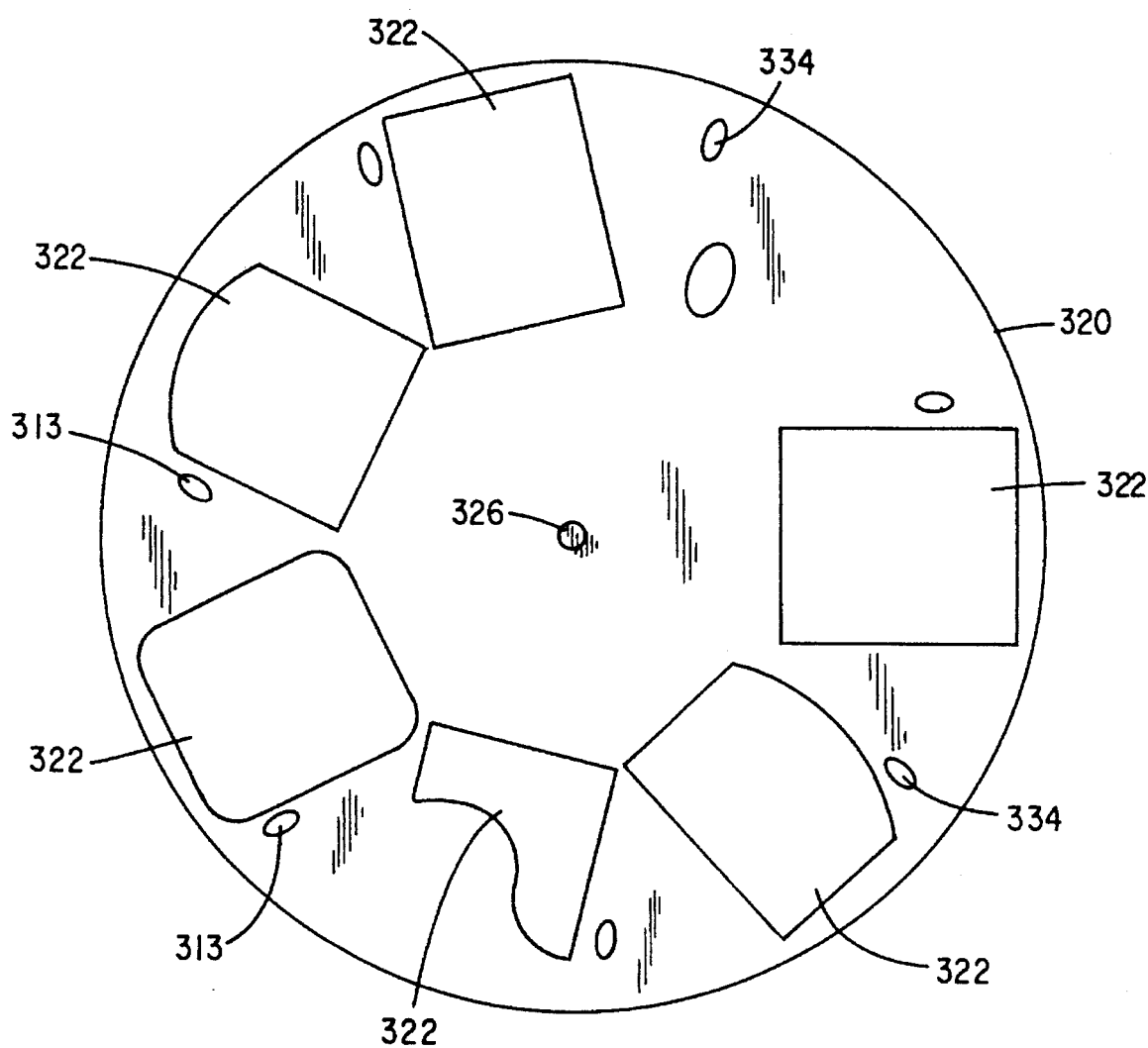
FIG. 2 is a front view of the special effects carrier disk showing a plurality of masks.

The special effects carrier 320 of FIG. 2 resides within the portrait camera which, in the preferred embodiment, contains a zoom lens system Z and a focus lens system S. The special effects carrier is generally positioned between the rear element 311 of the zoom lens system Z and the film port 314. The film port 314 allows the individualized frames of the film 316 to be exposed to light. As shown in FIG. 1, the carrier wheel 320 is displaced forward of the plane of film 316 by a predetermined distance. If the mask were in contact with the film 316, undesirable sharp edges rather than the desired soft or blurred effect associated with vignetting would be present on the film following exposure.

The carrier 320 can be of any appropriate configuration that permits the placement of multiple masks, however, in the preferred embodiment, it is a circular disk. As shown in FIG. 2, various special effects masks 322 may be located around the rim of the carrier 320. The masks 322 produce special effects on the photographs by modifying the optical characteristics of the image that is focused by the zoom lens system Z through the film port 314 and onto the film 316. A typical modification involves exposing or fogging only a portion of the film. Such masks are well-known by those skilled in the art, and some of the more common special effects used in portrait photography include burned corners, vignettes and soft focus, among others.

The carrier 320 can contain any suitable number and type of masks. In the preferred embodiment, however, seven different masks 322 are used. So that the operator has a wide variety from which to choose, in the preferred embodiment, these masks desirably consists of the following: Open (no effects), Vignette Vertical, Vignette Horizontal, Double Exposure, Double Exposure (side light required), Soft Focus and Burned Corners. Several carriers containing a diverse number of masks can also be made available to the photographer. Any carrier 320 used desirably includes a mask that does not modify the image produced on the film in any way, thereby allowing the photographer to take a photograph without any special effects. Thus, the carrier 320 can be permanently installed within to the camera body at the location shown in FIG. 1, allowing the camera to be used to produce photographs both with and without special effects.

The carrier 320 is desirably attached to the camera in a way that allows the carrier 320 to easily position any of the masks 322 in its effective location in front of the film port 314. In the preferred embodiment, a rod 326 with a generally circular cross section passes through the center of the carrier 320. The carrier 320 is attached to the rod 326 by appropriate attachment means so that the carrier 320 is allowed to rotate about the its own center axis. The carrier 320 can be attached to the camera by any suitable attachment means such as a support brace extending upwards from the camera. The attachment means should desirably elevate the rod 326 a sufficient height to allow the carrier 320 to have a full 360° rotational range.

Figure 3:
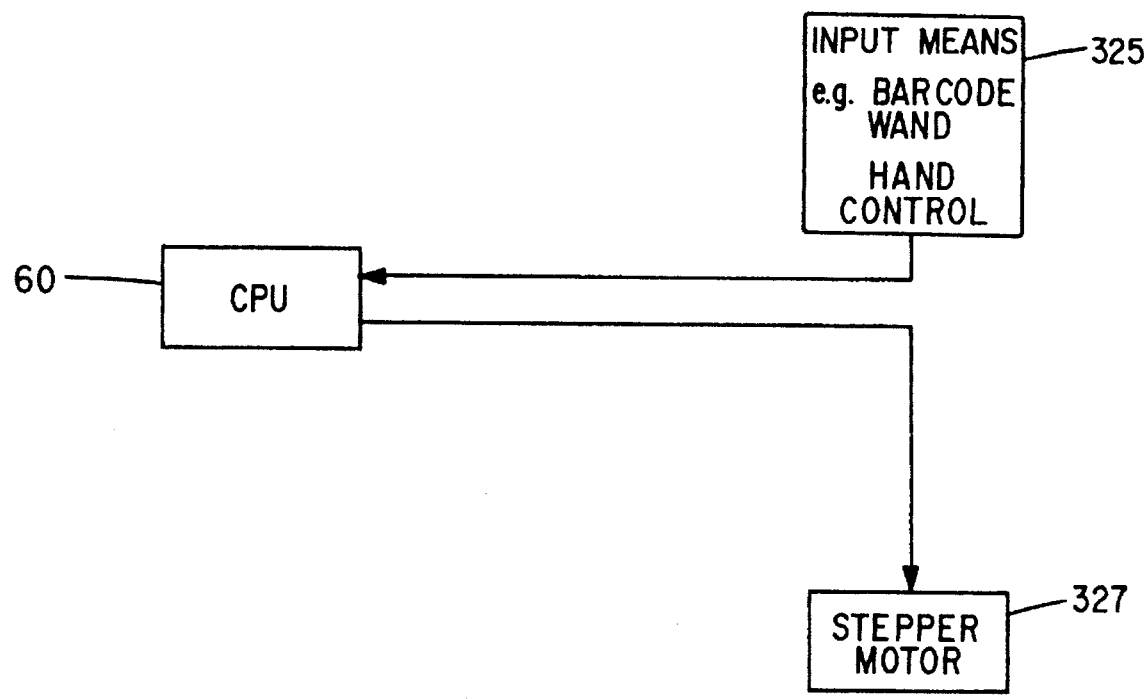
FIG. 3 is a schematic illustration of one embodiment of the automated system of the invention.

The masks on the carrier 320 can be positioned in a number of appropriate ways, including attachment to an external lever for manual operation by the photographer. Desirably, however, the carrier 320 may preferably be automatically rotated and positioned by means of a central processing unit (CPU) 60 (FIG. 3). A stepper motor 327 is mechanically connected to the carrier 320 and drives the carrier 320 to position a selected one of the masks in its proper location for use. The motor is controlled by to the CPU 60 which is preferably located outside of the camera. In the preferred embodiment, the CPU 60 is electrically connected to the camera's remote control or other input device, allowing the photographer to communicate with the CPU 60 via that device. As an aid in positioning the carrier 320, the camera desirably contains a means of detecting the position of the carrier 320 and the location of the various masks 322. Numerous detection methods are possible, but a method involving a sensor located within the camera that is capable of reading identification marks positioned on the carrier is preferred. Thus, in the preferred embodiment, bar codes, patches or other unique identifying characteristics as at 324, which are capable of being optically or mechanically sensed are placed on the carrier 320 or next to the masks 322.

An optical scanner 332 (FIG. 1) capable of reading the patches 334 or other characteristics is positioned within the camera next to the carrier 320. Other possible detection means include slots or apertures cut into the carrier, or discolorations or similar markings next to each of the masks. Mechanical sensors and sensors capable of tracking each rotation of the carrier can also be used.

In use, a sequence of poses is chosen by the subjects beforehand. This sequence is then entered into the CPU 60 through the use of a keyboard, bar code reading wand or any other suitable input means 325. The CPU 60 then activates the stepper motor 327 to rotate the carrier 320 until the proper mask 322 for the initial pose in a sequence is positioned in front of the film port 314. After the first picture is taken, the CPU 60 then rotates the carrier 320 until the proper mask 322 for the next picture is in place. If this mask is the same as the one previously used, the CPU 60 does not activate the motor and the carrier 320 remains in its previous position. This entire procedure continues until the pre-entered sequence is completed. At that point, a new sequence can be entered and shot.

The special effects carrier 320 allows the photographer to operate the camera as if a regular photograph without special effects was being taken. After the portrait subjects have been properly arranged, the photographer can use the zoom lens 318 to create whatever pose the subject desired and there is no need to reposition the special effects carrier other than to rotate it to select the desired special effect mask. If the portrait is not to contain any special effects, the carrier 320 is rotated so that the mask of frame containing no special effects is in position in front of the film port 314. The photograph is then taken and the procedure can be repeated for each photograph.

In a preferred embodiment, during the sequence of photographs, if the photographer, after taking a photograph, wishes to retake the picture (for example, if the subject blinked) then the photographer can alert the CPU 60 of this fact by pressing a button on the remote control or other input device 325. The CPU 60 will then delay rotating the carrier 320 to its next position until another photograph in the previous pose has been taken.

While a preferred embodiment of the present invention has been described, it should be understood that various changes, adaptations and modifications may be made therein without departing from the spirit of the invention and the scope of the appended claims.

What is claimed:

1. A portrait camera, comprising a zoom lens assembly having a stationary rear lens element, a film plane located behind a film port, and a special effects carrier including at least one mask thereon for modifying the optical characteristics of an image of a portrait subject focused by the zoom lens assembly on the film plane, the special effects carrier being disposed between the stationary rear lens element of the zoom lens assembly and the film port and spaced a predetermined distance forward of the film port sufficient to create a penumbra of the at least one mask on the film plane and thereby avoid a sharp image of the at least one mask on the film plane; and positioning means for selectively moving the special effects carrier to position the at least one mask in an optical beam path between the stationary rear lens element of the zoom lens assembly and the film port.

2. The camera of claim 1 wherein the special effects carrier remains a fixed distance from the film port upon actuation of the zoom lens assembly.

3. The camera of claim 2 wherein the special effects carrier has a first position in which the optical characteristics of the image focused by the objective lens onto the film port is modified by a selected mask on the special effects carrier and a second position in which the optical characteristics of the image focused by the zoom lens assembly onto the film port is unmodified.

4. The camera of claim 2 wherein the positioning means are automated.

5. The camera of claim 4 wherein the positioning means includes detection means for determining the location of each mask.

6. The camera of claim 5 wherein the detection means comprises marks positioned near the masks and a sensor capable of detecting the marks.

7. The camera of claim 6 wherein the marks comprise bar codes and the sensor comprises a bar code reader.

8. The camera of claim 6 wherein the marks comprise patches next to each mask and the sensor comprises an optical scanner.

9. The camera of claim 5 wherein the positioning means includes driving means for moving the special effects carrier.

10. The camera of claim 9 wherein the driving means comprises an external central processing unit operatively connected to a stepper motor.

11. The camera of claim 10 wherein the central processing unit includes input means for inputting data relating to the choice of mask desired.

12. The camera of claim 11 wherein the input means comprises a remote hand control.

13. The camera of claim 12 wherein the input means comprises a bar code wand.

14. The camera of claim 1 wherein the special effects carrier contains a plurality of masks.

15. The camera of claim 14 wherein the carrier includes a double exposure mask, a vignette mask, a soft focus mask and a burned corners mask.

16. The camera of claim 15 wherein the special effects carrier is circular.

17. The camera of claim 16 wherein the special effects carrier is rotatable to position the desired mask in the optical beam path.

18. A portrait camera, comprising a zoom lens assembly having a stationary rear lens element, a film plane located behind a film port and a rotatable, circular, special effects carrier disk including a first mask thereon shaped for modifying the optical characteristics of an image of a portrait subject focused by the zoom lens assembly through the film port onto the film plane and a second mask thereon in which the optical characteristics of the image of the portrait subject focused by the zoom lens assembly onto the film plane is unmodified, the special effects carrier disk being disposed between the stationary rear lens element and the film port a predetermined distance forward of the film plane sufficient to create a penumbra of a mask shape on the film plane to thereby avoid a sharp image of the mask shape on the film plane, the special effects carrier disk having reference indicia thereon; and a central processing unit coupled in driving relation to a stepper motor and a sensor positioned to sense the reference indicia for selectively rotating the special effects carrier disk to position one of the first and second masks between the stationary rear lens element of the zoom lens assembly and the film port.

* * * * *